United States Patent
Bowler et al.

(10) Patent No.: US 9,991,932 B2
(45) Date of Patent: Jun. 5, 2018

(54) MOCA NETWORK SYSTEM FOR MULTIPLE DWELLING UNITS

(71) Applicant: ARRIS Enterprises LLC, Suwanee, GA (US)

(72) Inventors: David B. Bowler, Stow, MA (US); Bruce C. Pratt, Bedford, NH (US); Theodore A. Colarusso, Madbury, NH (US); Xiang He, Reading, MA (US)

(73) Assignee: ARRIS Enterprises LLC, Suwanee, GA (US)

(*) Notice: Subject to any disclaimer, the term of this patent is extended or adjusted under 35 U.S.C. 154(b) by 0 days. days.

(21) Appl. No.: 15/445,130

(22) Filed: Feb. 28, 2017

(65) Prior Publication Data

US 2017/0250732 A1    Aug. 31, 2017

Related U.S. Application Data

(60) Provisional application No. 62/301,080, filed on Feb. 29, 2016.

(51) Int. Cl.
*H04B 3/36* (2006.01)
*H04B 3/54* (2006.01)
*H04L 27/26* (2006.01)

(52) U.S. Cl.
CPC .............. *H04B 3/36* (2013.01); *H04B 3/542* (2013.01); *H04L 27/2601* (2013.01); *H04Q 2213/13199* (2013.01)

(58) Field of Classification Search
None
See application file for complete search history.

(56) References Cited

U.S. PATENT DOCUMENTS

| 7,120,139 | B1* | 10/2006 | Kung | H04L 12/2801 370/352 |
| 8,649,271 | B2* | 2/2014 | Jackson | H04L 43/50 370/241 |
| 9,252,971 | B2* | 2/2016 | Clemm | H04L 12/5601 |
| 9,264,742 | B2* | 2/2016 | Ling | H04N 7/106 |
| 9,420,336 | B1* | 8/2016 | Woodhead | H04N 21/4408 |
| 2013/0077634 | A1* | 3/2013 | Finkelstein | H04L 65/1026 370/401 |
| 2013/0114625 | A1* | 5/2013 | Cunningham | H04L 41/5009 370/469 |

* cited by examiner

*Primary Examiner* — Hong Cho
(74) *Attorney, Agent, or Firm* — Thomas A. Ward

(57) ABSTRACT

A data network for a multiple dwelling unit (MDU) enables efficient use of a MoCA (Multimedia over Coax Alliance) system. The data network includes a distribution point unit (DPU) connected to an access network, a plurality of modems in the MDU, a plurality of coaxial cables extending through the MDU between the DPU and the plurality of modems, and at least one network expander present between the DPU and a subset of the plurality of modems. The network expander can be a repeater that retransmits received signals, wherein the DPU, the plurality of modems, and the network expander exchange data via the plurality of coaxial cables using MoCA protocols.

16 Claims, 15 Drawing Sheets

MOCA NETWORK SYSTEM FOR MULTIPLE DWELLING UNITS

CLAIM OF PRIORITY

This Application claims priority under 35 U.S.C. § 119(e) from earlier filed U.S. Provisional Application Ser. No. 62/301,080, filed Feb. 29, 2016, which is hereby incorporated by reference.

TECHNICAL FIELD

The present disclosure relates to the field of data networking, particularly a system for providing individual units in a multiple dwelling unit (MDU) with network access over coaxial cable using MoCA (Multimedia over Coax Alliance) technology.

BACKGROUND

Many uses of the internet, such as file transmission, video streaming, and videoconferencing, are best experienced when data can be transferred at high rates. Accordingly, users generally prefer high-bandwidth internet connections. High-bandwidth internet connections can be provided to some buildings, such as single family homes, relatively easily by connecting the building to a high-speed network with a single "last mile" connection.

However, providing high-bandwidth connections can be more challenging when a building is a multiple dwelling unit (MDU) with multiple units that each need their own separate network connection. While a last mile connection can be provided to the MDU, network architecture must be put in place that splits the single network connection among each unit. Accordingly, cable and other telecommunications companies have been developing systems for providing high-bandwidth network connections to customers in MDUs, including providing network access over loops that may be longer than 250 meters. In particular, many telecommunications companies are looking for solutions that can provide network access to MDU customers at speeds of 1 Gbps (Gigabit per second) or greater, at low power and low cost, and with flexible deployment options.

It is generally not feasible in most existing MDUs to install new high-speed network cables, like fiber optic cables or CAT5 cables, throughout the building to provide high-speed internet access to each unit. Instead, some solutions have attempted to provide network access over cables that are already present in the MDU, such as copper phone lines or coaxial cables originally installed for television.

For example, some solutions have used digital subscriber line (DSL) protocols such as G.fast to provide MDUs with network access over phone lines that already extend to each unit in the MDU. However, while speeds over G.fast can be relatively fast, they can be slower than some users would prefer. For example, in some implementations a G.fast network that splits an aggregate network connection with 2.5 Gbps downstream speeds and 1.25 Gbps upstream speeds to an MDU between sixteen units can result in a maximum aggregate data rate of only 700 Mbps per unit. Additionally, in some G.fast implementations network speeds can decrease substantially as the cable to the unit increases. For example, while a unit less than 100 meters away from an MDU's connection to an access network may be able to reach 1 Gbps aggregate data rates over G.fast, another unit in the same building that is 500 meters away from the access network connection may only reach 100 Mbps aggregate data rates due to the longer distance. Due to these issues with G.fast, telecommunications companies have been looking for solutions that use coaxial cable as an alternative and/or a supplement to G.fast in MDU environments.

What is needed is a system for providing network access to units of an MDU over coaxial cables that may already be present in an MDU. Such a system should provide each unit with comparable high-bandwidth network access regardless of their distance from the MDU's initial connection to an access network, and in some cases also allow cable or satellite television signals to be passed over the same coaxial cable.

SUMMARY

The present disclosure provides a Multimedia over Coax Alliance (MoCA) system, the system comprising at least one network expander for distributing at least one signal channel, at least one distribution point unit (DPU) distributing the at least one signal channel to and from the network expander, and one or more modems receiving the at least one signal channel, wherein the network expander is connected between the DPU and a set of the modems and retransmits received signals using MoCA protocols.

The present disclosure also provides Multimedia over Coax Alliance (MoCA) system, the system comprising at least one network expander for distributing at least one signal channel by retransmitting received signals using MoCA protocols.

The present disclosure also provides a data network for a multiple dwelling unit (MDU), the data network comprising a distribution point unit (DPU) comprising one or more coaxial cable ports and a network cable interface connected to an access network, a plurality of modems in the MDU, a plurality of coaxial cables extending through the MDU from the one or more coaxial cable ports of the DPU to the plurality of modems, and at least one network expander present between the DPU and a subset of the plurality of modems, the network expander being a repeater that retransmits received signals, wherein the DPU, the plurality of modems, and the at least one network expander exchange data via the plurality of coaxial cables using MoCA (Multimedia over Coax Alliance) protocols.

BRIEF DESCRIPTION OF THE DRAWINGS

Further details of the present invention are explained with the help of the attached drawings in which.

DETAILED DESCRIPTION

Figure 1:
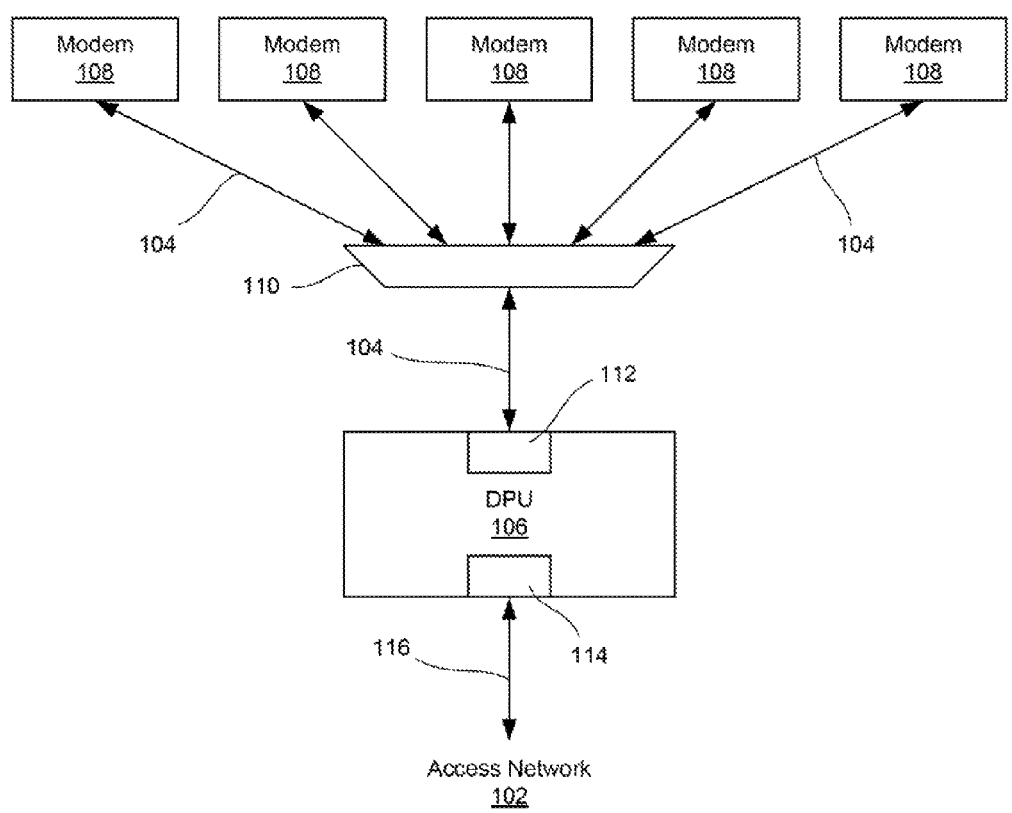
FIG. 1 depicts an exemplary embodiment of a multiple dwelling unit (MDU) network.

FIG. 1 depicts an exemplary embodiment of a multiple dwelling unit (MDU) network 100. An MDU network 100 can be present in an MDU such as an apartment building, condominium building, dormitory, retirement home, or any other building or complex that that has occupants in a plurality of different units. An MDU network 100 can be used to provide each unit in the MDU with its own connection to an access network 102, through which devices in the units can connect to a data network such as the Internet. By way of a non-limiting example, an access network 102 can be a passive optical network (PON), such as a Gigabit-capable passive optical network (GPON) or 10-Gigabit-capable passive optical network (XGPON). While network architecture and network components are described herein with respect to MDUs, they can also be used in other types of buildings or complexes that have multiple units that may desire separate network access, such as hotels or office buildings.

The MDU network 100 can comprise a plurality of lines of coaxial cable 104, one or more distribution point units (DPUs) 106, and one or more modems 108. The DPU 106 can be an interface between an access network 102 and the rest of the MDU network 100. By way of a non-limiting example, in some embodiments a connection to the access network 102 can enter an MDU at a basement or other area that is accessible to installers or maintenance workers, and the DPU 106 can be located at that area of the MDU.

The DPU 106 can be connected to modems 108 located in one or more locations in the MDU via coaxial cables 104. By way of a non-limiting example, coaxial cables 104 can extend into each of a plurality of different apartment units in an apartment building, such that modems 108 in those apartment units can be linked to the DPU 106 via the coaxial cable 104. In some embodiments a network of coaxial cable 104 can comprise splitters 110 that split one line of coaxial cable 104 into a plurality of lines of coaxial cable 104 that extend to different locations in the MDU.

In some embodiments the coaxial cables 104 in an MDU network 100 can be previously existing coaxial cabling that was already present in an MDU. By way of a non-limiting example an apartment building can have been built with a network of coaxial cable 104 that extends into each apartment unit in the building, such as coaxial cabling originally installed to provide the apartments with access to cable or satellite television. Accordingly, an MDU network 100 can re-use existing coaxial cable 104 in an MDU without the need to retrofit the MDU with new network cables. In other embodiments, an MDU can be newly built or retrofitted with coaxial cable 104 for the MDU network 100.

The MDU network 100, including components such as the DPUs 106 and modems 108, can be configured to transmit data over the coaxial cables 104 using a MoCA (Multimedia over Coax Alliance) protocol. Data can be transmitted over coaxial cable 104 using MoCA at speeds up to, or exceeding, 1 Gbps. In alternate embodiments, elements of the MDU network 100 can transmit data using MoCA wirelessly or over a different type of physical connection, such as fiber optic cables. Using MoCA, the MDU network 100 can be a fully meshed point to point network in which the network nodes, such as the DPUs 106 and modems 108, are bi-directionally connected.

MoCA transmits data over a plurality of RF (radio frequency) channels that span a range of frequencies, with each channel being divided into a plurality of sub-bands distinguished using orthogonal frequency-division multiplexing (OFDM). By way of a non-limiting example, MoCA 2.0 uses RF channels within a frequency range from 500 MHz to 1650 MHz.

Elements of an MDU network 100, including DPUs 106, modems 108, and other equipment such as network expanders 704 discussed below, can be single-band or dual-band bonded MoCA devices. Single-band elements can transmit data using channels in one range of RF frequencies, while dual-band elements can transmit data simultaneously using channels in two different frequency ranges. The frequency ranges used for single-band and/or dual-band embodiments can be link aggregated over multiple RF channels. By way of a non-limiting example, in some embodiments dual-band devices can aggregate across four separate OFDM blocks, while other embodiments can be aggregated across more or fewer OFDM blocks. In some embodiments single-band and dual-band equipment can be compatible with one another in the same MDU network 100. By way of a non-limiting example, a dual-band DPU 106 can exchange data with a single-band modem by using channels in the band known to the modem 108.

In some embodiments the DPUs 106 and modems 108 in an MDU network 100 can be configured to use frequencies in the MoCA range to transmit data that do not conflict with frequencies used to transmit cable television to units over the same coaxial cable 104. By way of a non-limiting example, the DPUs 106 and modems 108 can transmit data using frequencies between 500 MHz and 850 MHz, while a television provider can transmit television signals over the same coaxial cable 104 using frequencies between 950 MHz and 2150 MHz. By way of another non-limiting example, the DPUs 106 and modems 108 can transmit data using frequencies between 800 MHz and 1650 MHz, while a television provider can transmit television signals over the same coaxial cable 104 using frequencies between 54 MHz and 700 MHz. As such, the MDU network 100 can allow data and television transmissions to coexist on the same coaxial cable 104.

A DPU 106 can comprise one or more coaxial ports 112 and one or more network cable interfaces 114. A coaxial port 112 can receive a coaxial cable 104, in order to provide a link for upstream and/or downstream data connections with other devices in the MDU network 100. As described above, a DPU 106 can use MoCA to transmit and receive data via coaxial cable 104 through its coaxial ports 112.

A network cable interface 114 can be a port at the DPU 106 that can receive a network cable 116, such as a fiber optic cable or CAT5 cable. A network cable 116 coupled with a network cable interface 114 can provide a link for upstream and/or downstream data connections with other devices and/or networks.

In some embodiments a network cable interface 114 can be a pluggable transceiver that can be removably inserted into the DPU 106. By way of a non-limiting example, in some embodiments a network cable interface 114 can be a small form-factor pluggable (SFP) As such, different pluggable transceivers can be swapped out to change or upgrade a DPU's network cable interface 114, or to change the type of network cable 116 the network cable interface 114 accepts. In alternate embodiments a network cable interface 114 can be a network cable port permanently integrated into the DPU 106.

At least one network cable interface 114 in a DPU 106 can provide a direct or indirect link to an access network 102 via a network cable 116. In some embodiments or situations a network cable 116 connected to a network cable interface 114 can be a fiber optic cable linked to a PON or other access network 102. In other embodiments or situations a network cable 116 connected to a network cable interface 114 can be an Ethernet cable linked to another network element that is linked to the access network 102, such that the DPU 106 can have indirect network access to the access network 102 via the Ethernet cable and intermediate network elements.

Figure 2:
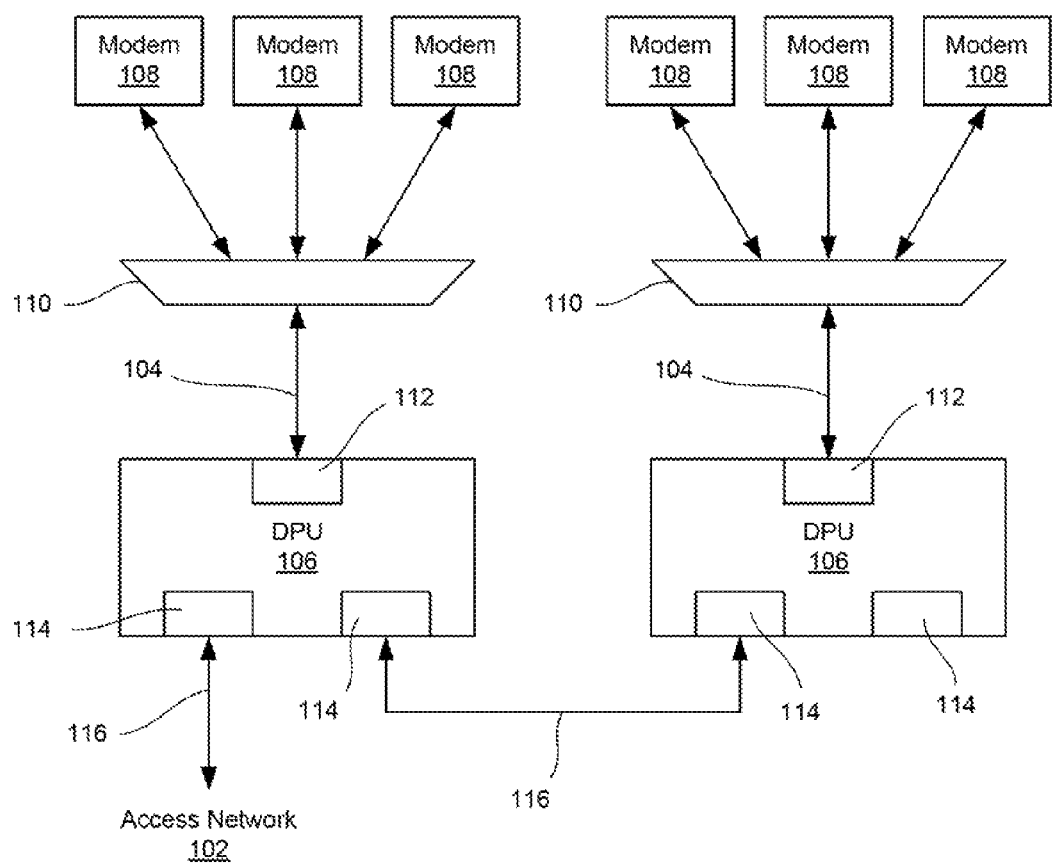
FIG. 2 depicts an exemplary embodiment of an MDU network in which two distribution point units (DPUs) are daisy chained together.

As shown in FIG. 2, in embodiments in which at least one DPU 106 has two network cable interfaces 114, network cables 116 can be connected between the network cable interfaces 114 of different DPUs 106 to daisy chain the DPUs 106 together. By way of a non-limiting example a network cable 116, such as a fiber optic cable, can connect a first DPU 106 to an access network 102 through one of its network cable interfaces 114. Another network cable 116, such as a CAT5 Ethernet cable, can then connect a second network cable interface 114 at the first DPU 106 to a network cable interface 114 at a second DPU 106. As such, the second DPU 106 can reach the access network 102 via the network cable 116 connected to the first DPU 106. Similarly, additional DPUs 106 can be connected to earlier DPUs 106 in the chain as desired via the network cable interfaces 114.

Figure 3:
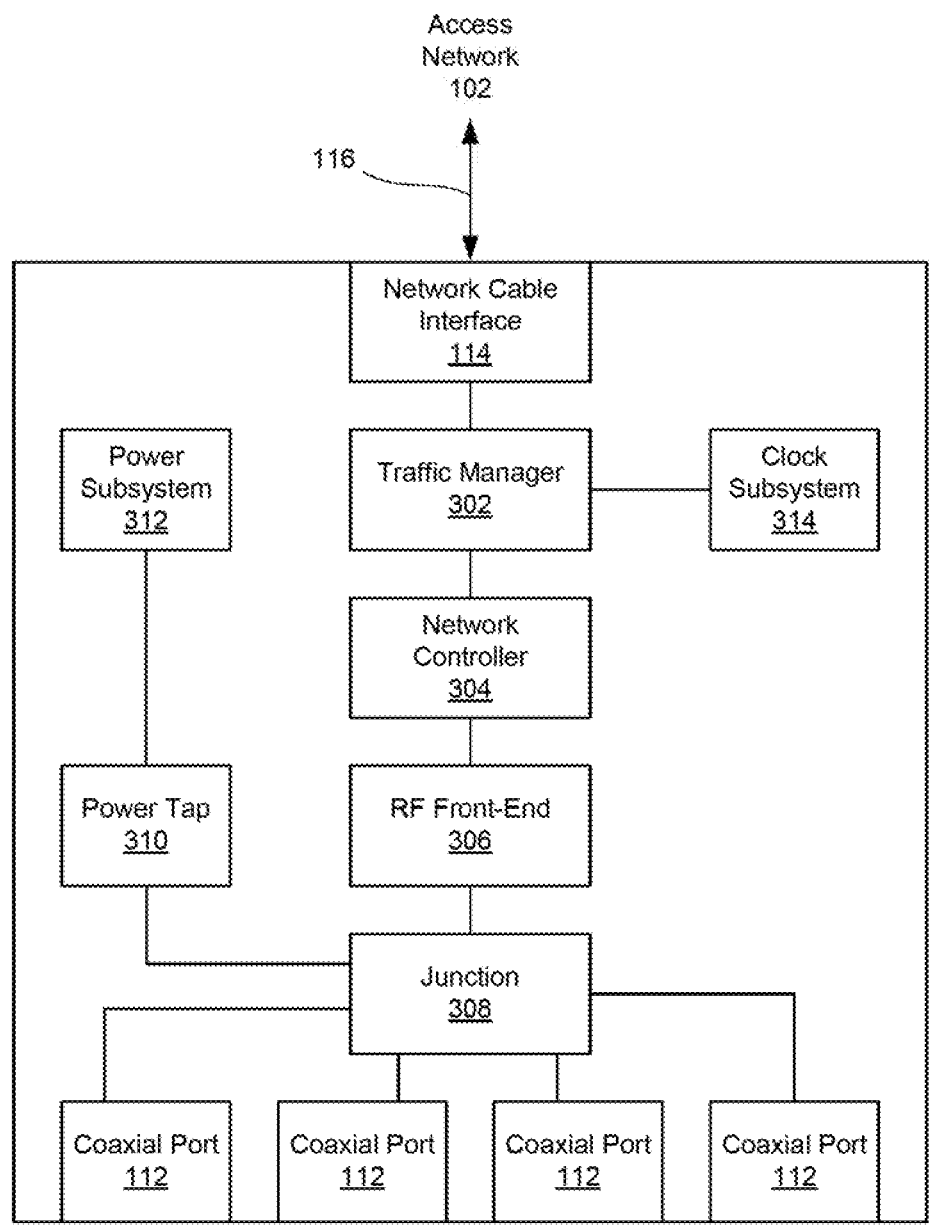
FIG. 3 depicts an exemplary embodiment of a single-band DPU.

FIG. 3 depicts an exemplary embodiment of a single-band DPU 106. A single-band DPU 106 can comprise one network cable interface 114 and a plurality of coaxial ports 112. By way of a non-limiting example the single-band DPU 106 shown in FIG. 3 has four coaxial ports 112, however in alternate embodiments the DPU 106 can have any other number of coaxial ports 112. The network cable interface 114 can be linked to the plurality of coaxial ports 112 through a chain comprising a traffic manager 302, a network controller 304, an RF front-end (RFFE) 306, and a junction 308.

The traffic manager 302 can process network traffic to enforce class of service (CoS) and quality of service (QoS) policies. CoS policies can prioritize network traffic for subscribers that have subscribed to higher tiers of network access. By way of a non-limiting example, when one customer has a Service Level Agreement (SLA) that guarantees a minimum data throughput level, such as 500 Mbps symmetric service, and another customer has an SLA that guarantees only best effort data throughput, traffic to the higher-tier customer's modem 108 can be prioritized if network requests from both customers exceed network capacity. QoS policies can prioritize network traffic based on the type of data being transferred. By way of a non-limiting example, traffic that is sensitive to delay, such as streaming video or VoIP (voice over IP), can be prioritized over traffic that can is less sensitive to delay, such as delivering a webpage. In some embodiments, CoS policies can take precedence over QoS policies. By way of a non-limiting example, if a customer with a high CoS is requesting low QoS data, but another customer with a lower CoS is requesting high QoS data, the higher CoS customer's traffic can be prioritized over the lower CoS customer's traffic despite the different QoS levels. By way of another non-limiting example, when a customer with an SLA that guarantees 100 Mbps symmetric data service requests 1 Gbps service, CoS policies can be enforced to provide the first 100 Mbps of data while the remainder can be enforced based on QoS policies depending on network traffic to other customers. In alternate embodiments the traffic manager 302 can be absent, such as if network traffic is being delivered on a best effort basis, or if CoS and/or QoS are instead handled by the network controller 304.

The network controller 304 can manage network operations performed by the DPU 106. By way of non-limiting examples, the network controller 304 can handle physical layer (PHY) functions and/or link layer functions such as media access control (MAC). When a dedicated traffic manager 302 is absent, in some embodiments the network controller 304 can perform CoS and/or QoS operations.

The RF front-end 306 can perform conversion and/or processing operations on data transmissions, such as modulation, upconversion, filtering, amplification, downconversion and/or demodulation.

The junction 308 can split a connection between the RF front-end 306 and the junction 308 into a plurality of connections to the coaxial ports 112. In some embodiments one or more of the plurality of coaxial ports 112 can receive power over connected coaxial cables 104. The junction 308 and/or the individual coaxial ports 112 can be linked to a power tap 310 that is also connected to a power subsystem 312 in the DPU 106. The power tap 310 can provide power to, and/or draw power from, the power subsystem 312.

The power subsystem 312 can be linked to the other components of the DPU 106 via the power tap 310 and/or junction 308. As such, the power subsystem 312 can manage power received by the DPU 106 through the coaxial ports 112, and can provide power to the DPU's components. In some embodiments the power subsystem 312 can comprise one or more batteries that can store power received by the DPU 106 until it is needed to power the DPU 106.

In some embodiments the DPU 106 can be reverse powered by one or more other network elements connected to the coaxial ports 112 via coaxial cables 104. By way of a non-limiting example, modems 108 located in apartment units can be powered by electrical outlets in the units, and those modems 108 can be connected to a DPU's coaxial port 112 via the coaxial cables 104. As such, the modems 108 can draw power from electrical outlets in the apartment units and transfer some of that power through the coaxial cable 104 to the DPU's power subsystem 312 through a coaxial port 112 and power tap 310. Accordingly, in some embodiments the DPU 106 can be reverse powered without being directly powered at its location within the MDU. In alternate embodiments the DPU 106 can be powered directly from an electrical outlet or other electrical connection.

A single-band DPU 106 can further comprise a clock subsystem 314 that can provide reference clocks used by other subsystems in the DPU 106. By way of a non-limiting example, a clock subsystem 314 can be linked to the traffic manager 302 and/or network controller 304.

Figure 4:
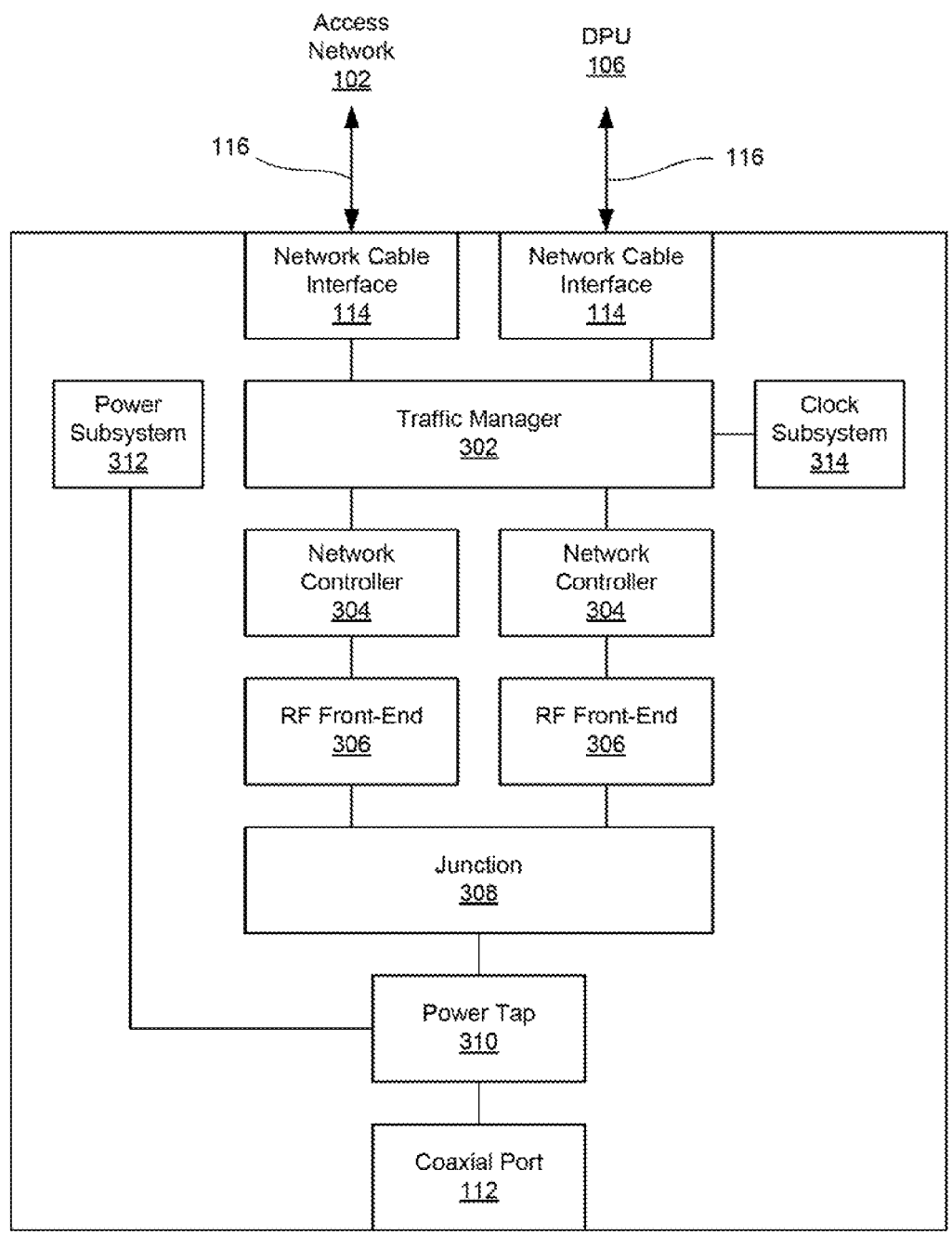
FIG. 4 depicts an exemplary embodiment of a dual-band DPU.

FIG. 4 depicts an exemplary embodiment of a dual-band DPU 106. A dual-band DPU 106 can comprise two network cable interfaces 114 and one coaxial port 112. In a dual-band DPU 106, each network cable interface 114 can be linked to the same traffic manager 302. In addition to enforcing CoS and QoS, in a dual-band DPU 106 the traffic manager 302 can also perform link aggregation. By way of a non-limiting example, the traffic manager 302 can aggregate a plurality of separate OFDM blocks. The traffic manager 302 can be linked to a junction 308 by two parallel links that each comprise a network controller 304 and an RF front-end 306. In a dual-band DPU 106, each RF front-end 306 can convert between binary digital form and different ranges of RF frequencies in the MoCA range. By way of a non-limiting example, one RF front-end 306 can handle data transmissions sent within a first range of MoCA frequencies, while the other RF front-end 306 can handle data transmissions sent within a second range of MoCA frequencies.

The junction 308 in a dual-band DPU 106 can be linked to the coaxial port 112 through an intermediate power tap 310 that can provide power to, and/or draw power from, a power subsystem 312. In some embodiments the coaxial port 112 can receive power through a coaxial cable 104 from other network elements, such that the DPU 106 can be reverse powered as described above with respect to the single-band DPU 106 shown in FIG. 3.

A dual-band DPU 106 can further comprise a clock subsystem 314 that can provide reference clocks used by other subsystems in the DPU 106. By way of a non-limiting example, a clock subsystem 314 can be linked to the traffic manager 302 and/or the network controllers 304.

Figure 5:
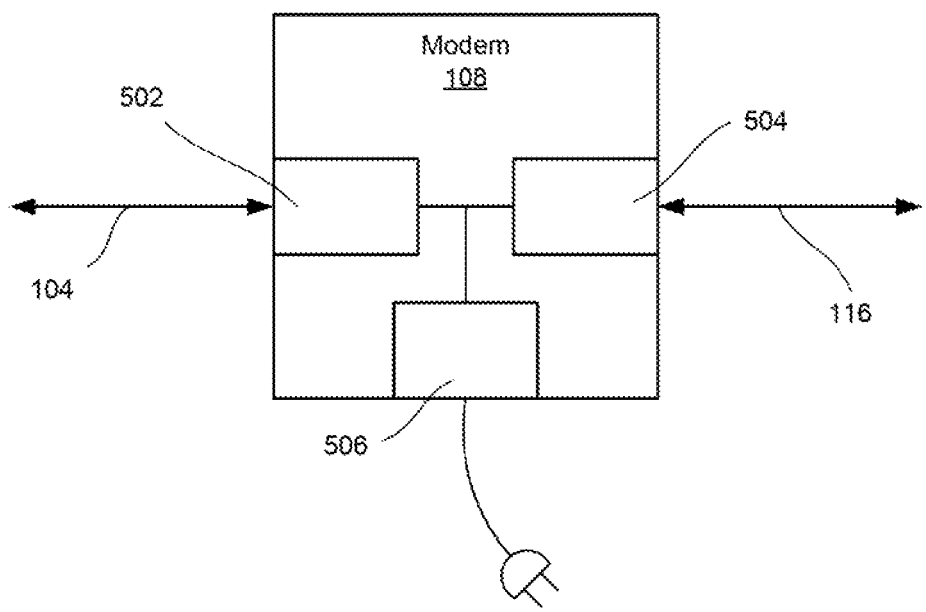
FIG. 5 depicts an exemplary embodiment of a modem.

FIG. 5 depicts an exemplary embodiment of a modem 108. In some embodiments a modem 108 can comprise a modem coaxial port 502, a modem network cable port 504, and a modem power connector 506. The modem's coaxial port 502 can be connected to a coaxial cable 104 extending through the MDU from a DPU 106, as described above. The modem 108 can be configured to exchange data with the DPU 106 via the coaxial cable 104 using MoCA.

A modem network cable port 504 can accept a network cable 116, such as a CAT5 cable, for linking the modem 108 to another device and sharing network access with that device. While in some situations a modem 108 can be directly linked to a computer or other networked device through a network cable 116, in other situations a network cable 116 can link the modem 108 to a router that can share the modem's network access with a plurality of different devices via wired connections and/or wireless connections such as Wi-Fi connections. In alternate embodiments the modem 108 can itself comprise a wired and/or wireless router, such that the modem 108 has a plurality of modem network cable ports 504 for different wired connections to devices and/or can provide wireless data connections to multiple other devices.

A modem power connector 506 can be a power cable, or a port for accepting a power cable, such that the power cable can transfer electricity from a wall outlet or other power source to the modem 108. Power received via the modem power connector 506 can power the modem's operations. In some embodiments power received by the modem 108 can also be passed via the modem coaxial port 502 through coaxial cables 104 to a coaxial port 112 at a DPU 106, such that the DPU 106 can be reverse powered as described above. In some embodiments a dedicated modem power connector 506 can be absent, and the modem 108 can receive power transmitted over coaxial cables 104 via a modem coaxial port 502.

Figure 6:
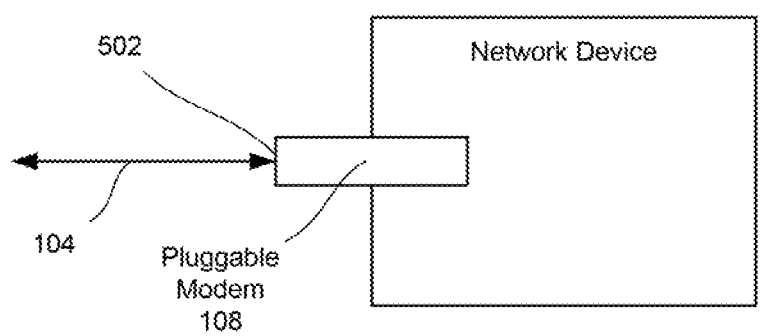
FIG. 6 depicts an exemplary embodiment of a pluggable transceiver modem.

FIG. 6 depicts an alternate embodiment of a modem 108, in which the modem is a pluggable transceiver. In embodiments in which the modem 108 is a pluggable transceiver, the modem 108 that can be inserted directly into another network device to provide that device with network access. By way of a non-limiting example, a modem 108 can be a small form-factor pluggable (SFP) that can be plugged into a cable box or video gateway to provide it with network access. In this embodiment the modem 108 can comprise a modem coaxial port 502 and pluggable connector that can be inserted into a corresponding port in a network device. In this embodiment the modem 108 can lack a power port, and it can instead receive power through a connected coaxial cable 104 and/or from the connected network device. By way of a non-limiting example, when the port in the network device that receives a pluggable transceiver modem 108 does not provide sufficient power to the pluggable transceiver modem 108, the pluggable transceiver modem 108 can receive some or all of its power through a coaxial cable 104.

A modem 108 can be configured to process network traffic being sent or received via the modem 108. By way of a non-limiting example, in some embodiments the modem 108 can enforce CoS and/or QoS policies similar to the traffic manager 304 of a DPU 106.

As with DPUs 106, a modem 108 can single-band or dual-band. Dual-band modems 108 can transmit data in two different RF frequency ranges, and as such can transmit more data simultaneously than single-band modems 108. By way of a non-limiting example, in some embodiments a single-band modem 108 can have 1 Gbps aggregate downstream and upstream data rates, while a dual-band modem 108 can have 2 Gbps aggregate downstream and upstream data rates. Accordingly, in some embodiments a dual-band modem 108 that supports 2 Gbps aggregate speeds can be used when a service level agreement (SLA) with a user indicates symmetric bandwidth of 1 Gbps download speeds and also 1 Gbps upload speeds.

Figure 7:
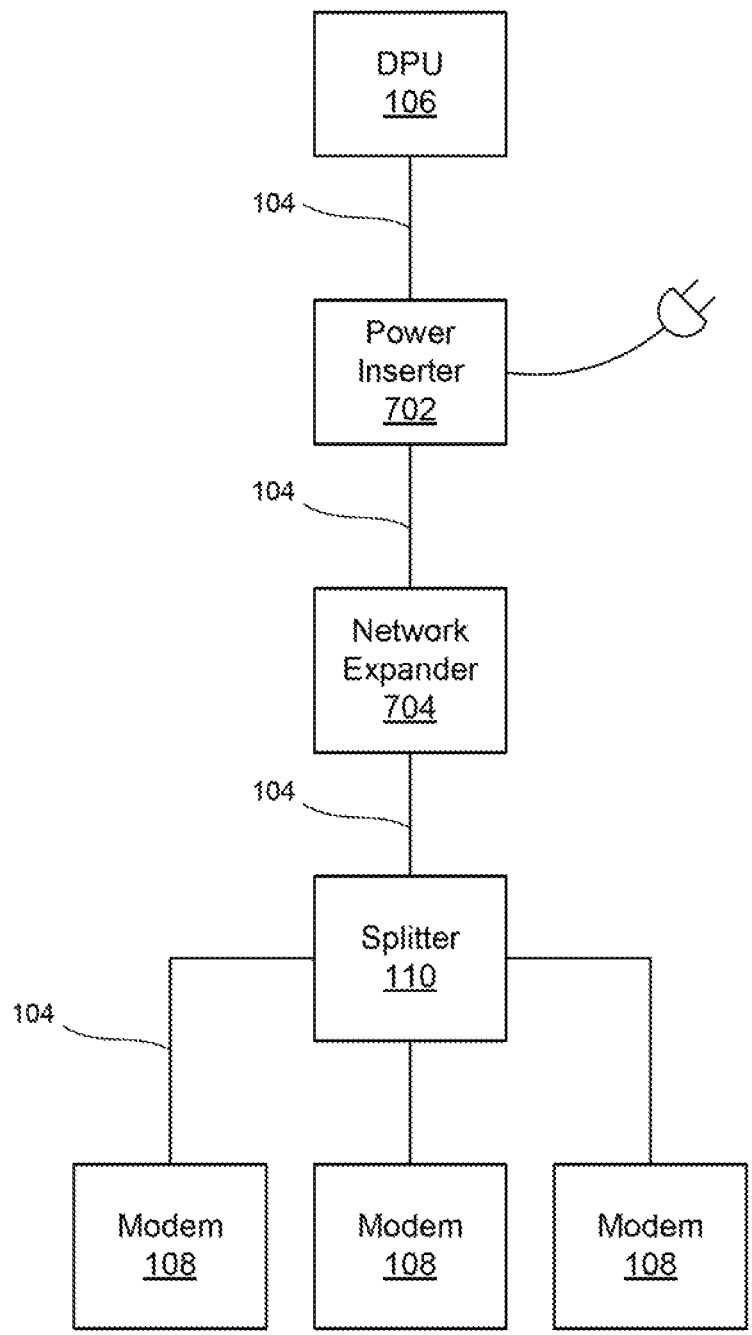
FIG. 7 depicts an exemplary embodiment in which a power inserter and a network expander are present between a DPU 106 and modems.

FIG. 7 depicts an exemplary embodiment in which a power inserter 702 and a network expander 704 are connected via coaxial cables 104 between a DPU 106 and modems 108 in an MDU network 100.

A power inserter 702 can be connected to a wall outlet or other power source in an MDU, such that it can provide power via coaxial cable 104 to other elements of the MDU network 100. By way of a non-limiting example, a power inserter can provide power to the DPU 106 and/or modems 108 such that they can be reverse powered over coaxial cable 104 as described above.

A network expander 704 can be a repeater element connected between a DPU 106 and one or more modems 108, such that it can receive and re-transmit data over coaxial cable 104 using MoCA. In some embodiments a network expander 704 can receive an RF signal, downconvert it if necessary, demodulate it, and convert to digital bits, then remodulate it and upconvert it if necessary before transmitting it again. As such, the network expander 704 can examine the digital bits to enforce CoS and/or QoS policies, and/or change destination addresses or other elements of a data packet. By way of a non-limiting example, the network expander 704 can ensure that high CoS modems 108 subtended by the network expander 704 aren't starved by modems 108 that are not being subtended by that network expander 704.

Network expanders 704 can be single-band or dual-band, such that they can receive and re-transmit data in one or two MoCA RF frequency ranges. As shown in FIG. 7, in some embodiments a power inserter 702 can provide power to a network expander 704 via intermediate coaxial cable 104. In alternate embodiments a network expander 704 can receive power directly from its own power connection.

A network expander 704 can retransmit received data over coaxial cable 104. As such, the data can be passed over a longer link of coaxial cable 104 without losing throughput. In some embodiments multiple network expanders 704 can be present in series along a line from a DPU 106 to a modem 108, such that the length of the coaxial cable 104 link can be extended multiple times to reach a unit in an MDU.

A network expander 704 can also expand the number of modems 108 that can be connected to a DPU 106 in an MDU network 100. In some embodiments a network expander 704 can be a single network element that manages traffic sent to and from a set of modems 108 subtended by the network expander 704 via a splitter 110. By way of a non-limiting example, if a DPU 106 natively supports connections with up to 15 modems 108, a network expander 704 can connect to the DPU 106 as if it were one of those 15 modems 108 such that it can manage traffic to and from a group of subtended modems 108, thereby allowing more than 15 modems to be connected to the DPU 106.

Figure 8:
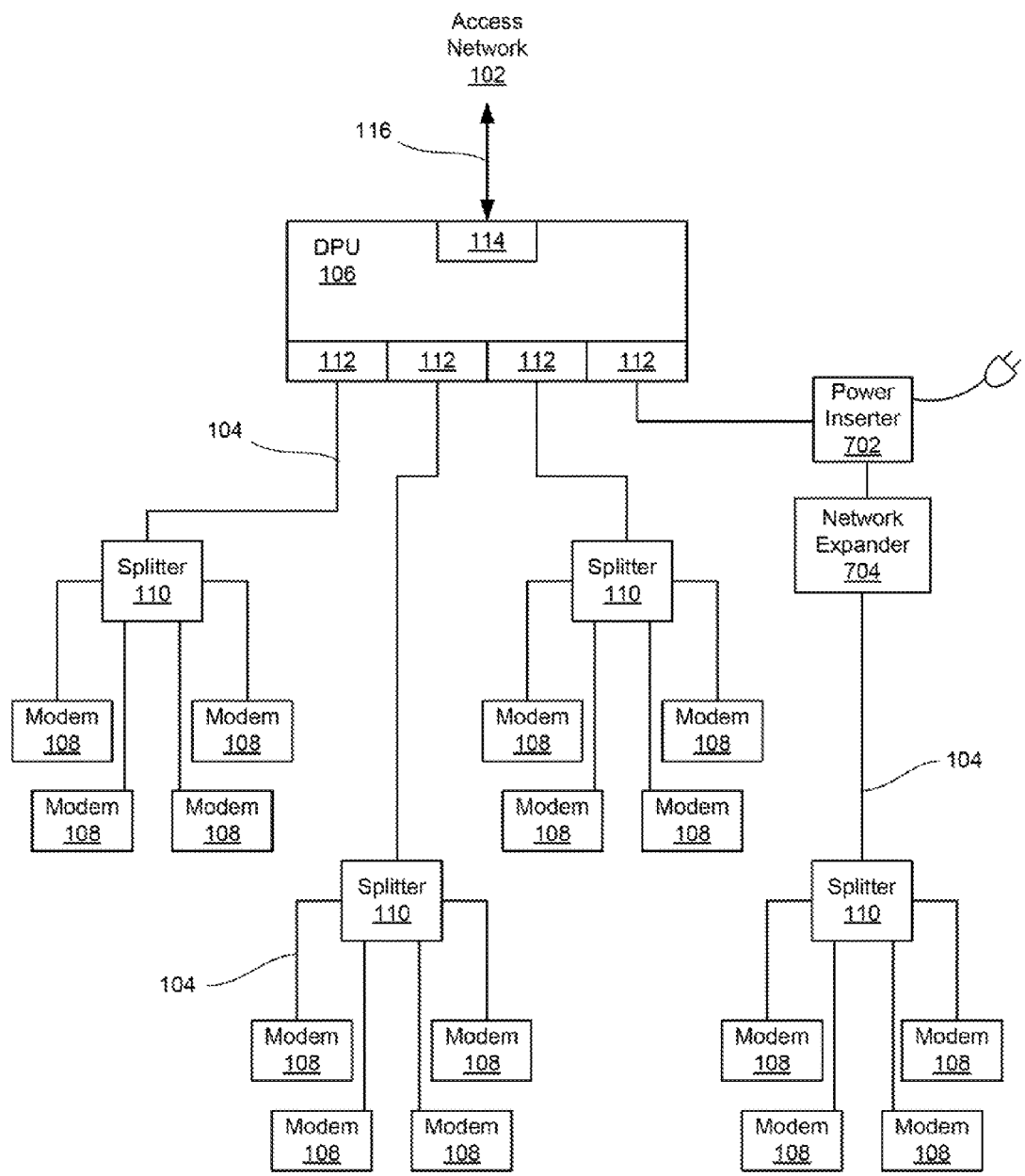
FIG. 8 depicts a non-limiting example of a single-band MDU network in use.

FIG. 8 depicts a non-limiting example of a single-band MDU network 100 in use. In this exemplary embodiment, a single-band DPU 106 connected to an access network 102 has four coaxial ports 112 each linked with a coaxial cable 104 to a splitter 110. Each splitter 110 can split into a plurality of coaxial cables 104 passing through the MDU to single-band modems 108 in different units. As such, a modem 108 in each unit can be connected to the single-band DPU 106 and gain access to the access network 102. The single-band DPU 106 and modems 108 can exchange data over the coaxial cables 104 using MoCA. In some embodiments dual-band modems 108 can also be connected to a single-band DPU 106 and exchange data in one of the two bands. One or more network expanders 704 and/or power inserters can also be present to extend any of the lines of coaxial cable 104 between the DPU 106 and modems 108.

Figure 9A:
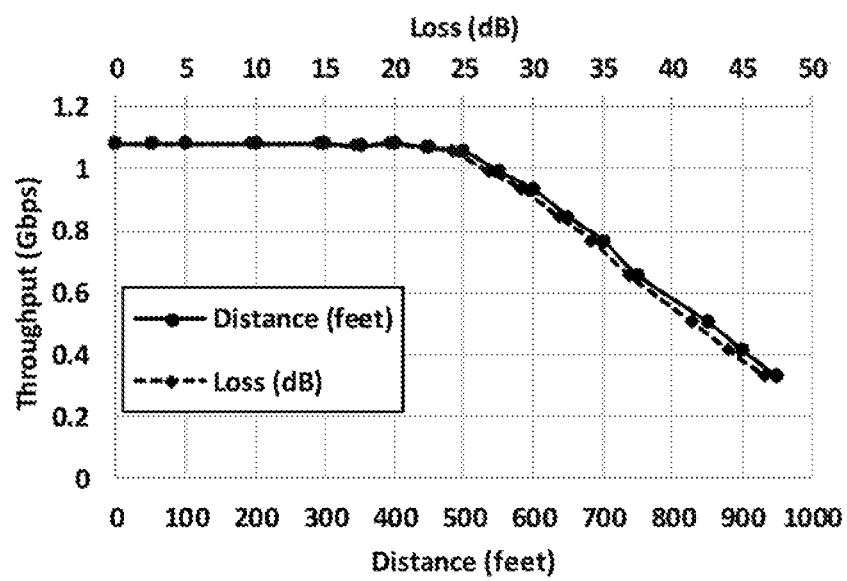
FIG. 9A depicts a graph of aggregate data rates measured during a test at different distances between a single-band DPU and a single-band modem.
Figure 9B:
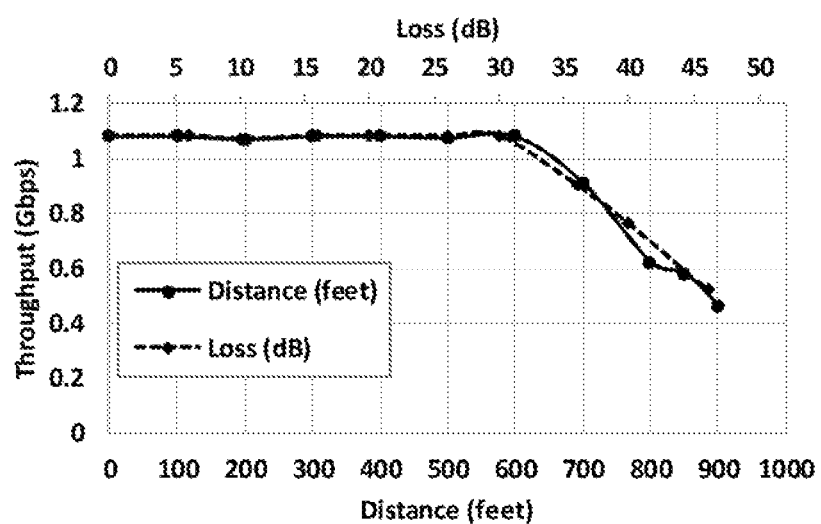
FIG. 9B depicts a graph of aggregate data rates measured during a test at different distances between a single-band network expander and a single-band modem.
Figure 9C:
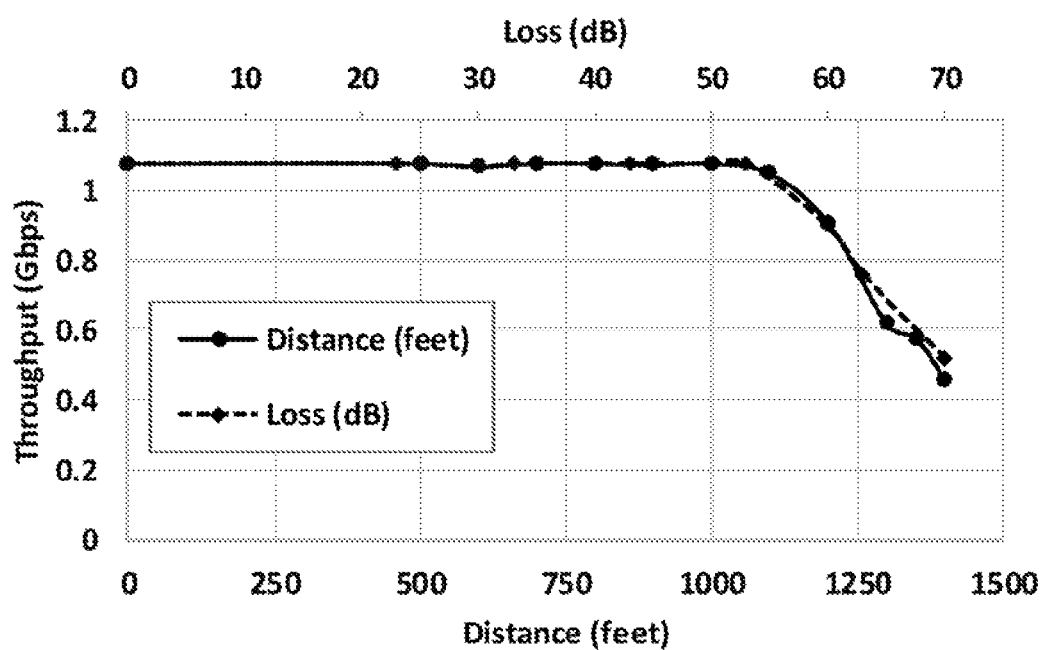
FIG. 9C depicts a graph of aggregate data rates measured during a test at different distances between a single-band DPU and a single-band modem when one single-band DPU is present between them.

FIGS. 9A-9C depict graphs of aggregate data rates measured at different distances using test embodiments of a single-band DPU 106, a single-band modem 108, and a single-band network expander 704.

FIG. 9A depicts a graph of aggregate data rates measured during a test at different distances between a single-band DPU 106 and a single-band modem 108. As shown, in some embodiments aggregate data speeds between a single-band DPU 106 and a single-band modem 108 can be over 1 Gbps using MoCA across a coaxial cable 104 link that is up to 500 feet long. As such, single-band modems 108 connected to a single-band DPU 106 with coaxial cables 104 shorter than 500 feet long can achieve peak aggregate data speeds of over 1 Gbps.

FIG. 9B depicts a graph of aggregate data rates measured during a test at different distances between a single-band network expander 704 and a single-band modem 108. As shown, in some embodiments, a single-band network expander 704 can provide an additional 600 feet of distance at which data can be transferred at 1 Gbps aggregate speeds.

FIG. 9C depicts a graph of aggregate data rates measured during a test at different distances between a single-band DPU 106 and a single-band modem 108 when one single-band DPU 106 is present between them. As shown, aggregate data speeds can be over 1 Gbps using MoCA across a coaxial cable 104 link that is up to 1100 feet long when the link is extended with a single-band network expander 704.

Accordingly, as shown in FIGS. 9A-9C, while a single-band modem 108 can achieve peak 1 Gbps aggregate speeds without a network expander 704 when its link to a single-band DPU 106 is less than 500 feet, a single-band network expander 704 can be used to provide peak 1 Gbps aggregate speeds to single-band modems 108 that are farther away within an MDU. Although not shown, additional network-expanders 704 could further increase the distance at which 1 Gbps aggregate speeds could be provided.

Figure 10:
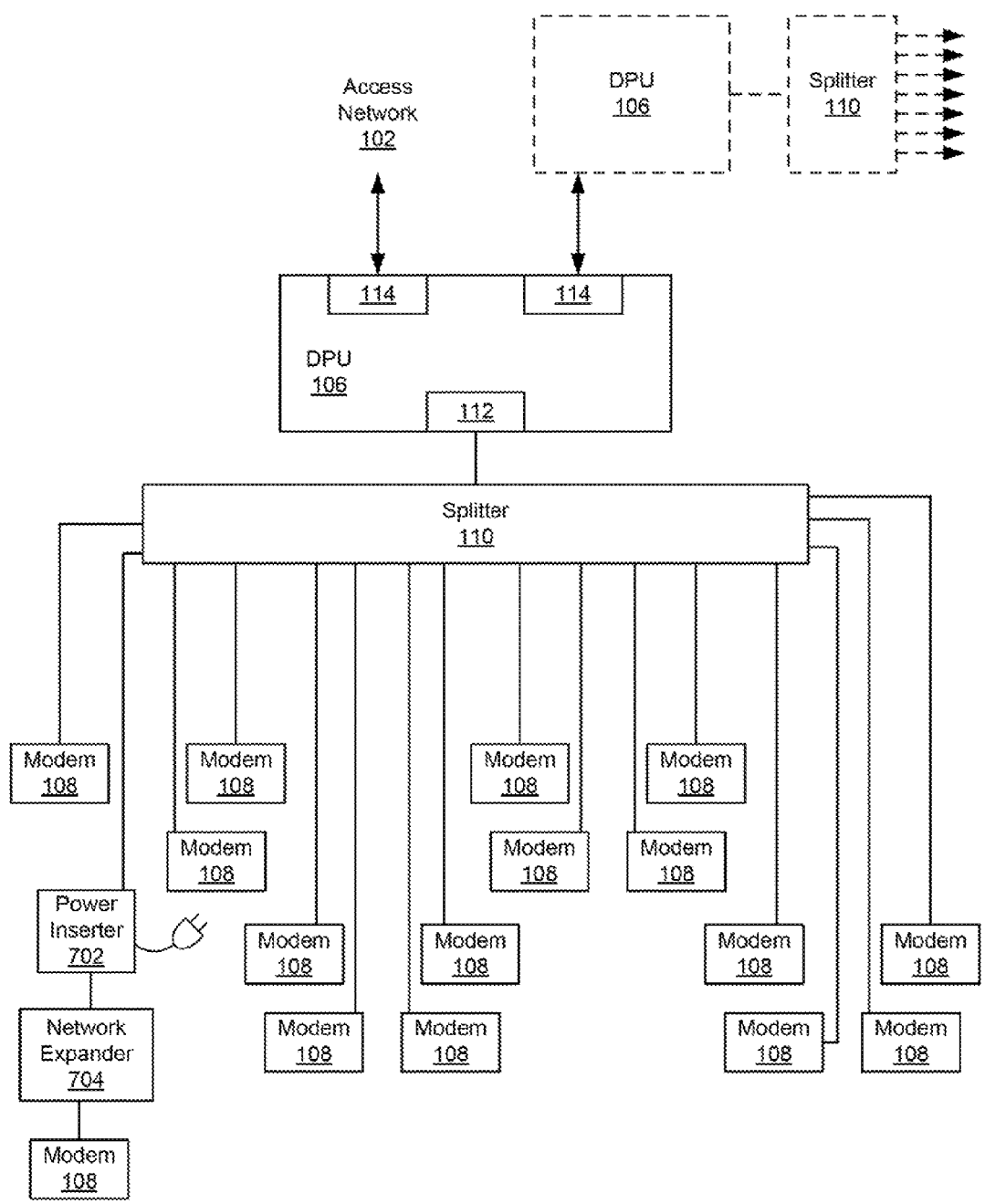
FIG. 10 depicts a non-limiting example of a dual-band MDU network in use.

FIG. 10 depicts a non-limiting example of a dual-band MDU network 100 in use. In this exemplary embodiment, a dual-band DPU 106 connected to an access network 102 has one coaxial port 112 connected to a splitter 110. The splitter 110 can split into a plurality of coaxial cables 104 passing through the MDU to dual-band modems 108 in different units. As such, a dual-band modem 108 in each unit can be connected to the dual-band DPU 106 and gain access to the access network 102. The dual-band DPU 106 and dual-band modems 108 can exchange data over the coaxial cables 104 using MoCA. In some embodiments single-band modems 108 can also be connected to a dual-band DPU 106 and exchange data in one of the two bands. One or more network expanders 704 and/or power inserters can also be present to extend any of the lines of coaxial cable 104 between the DPU 106 and modems 108.

Figure 11A:
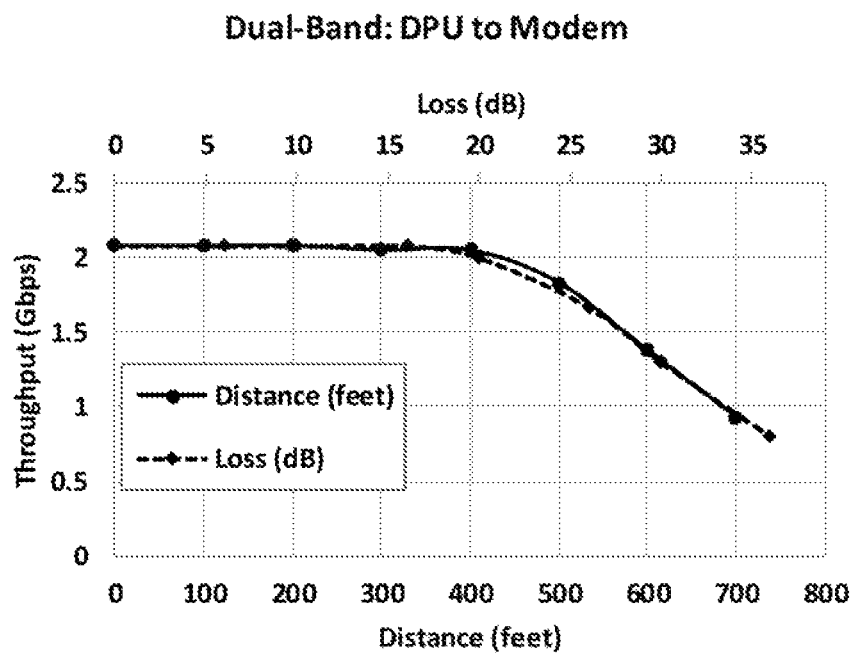
FIG. 11A depicts a graph of aggregate data rates measured during a test at different distances between a dual-band DPU and a dual-band modem.
Figure 11B:
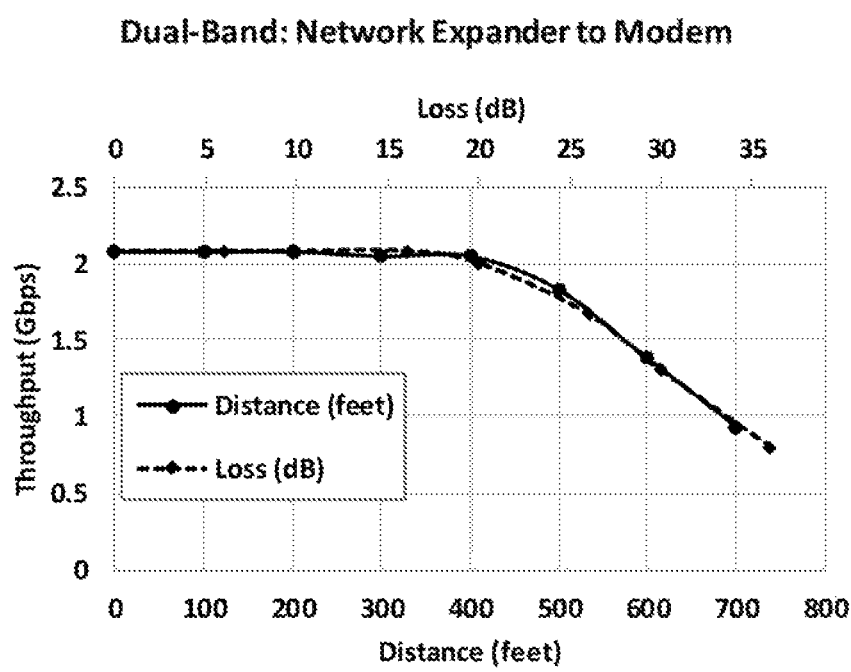
FIG. 11B depicts a graph of aggregate data rates measured during a test at different distances between a dual-band network expander and a dual-band modem.
Figure 11C:
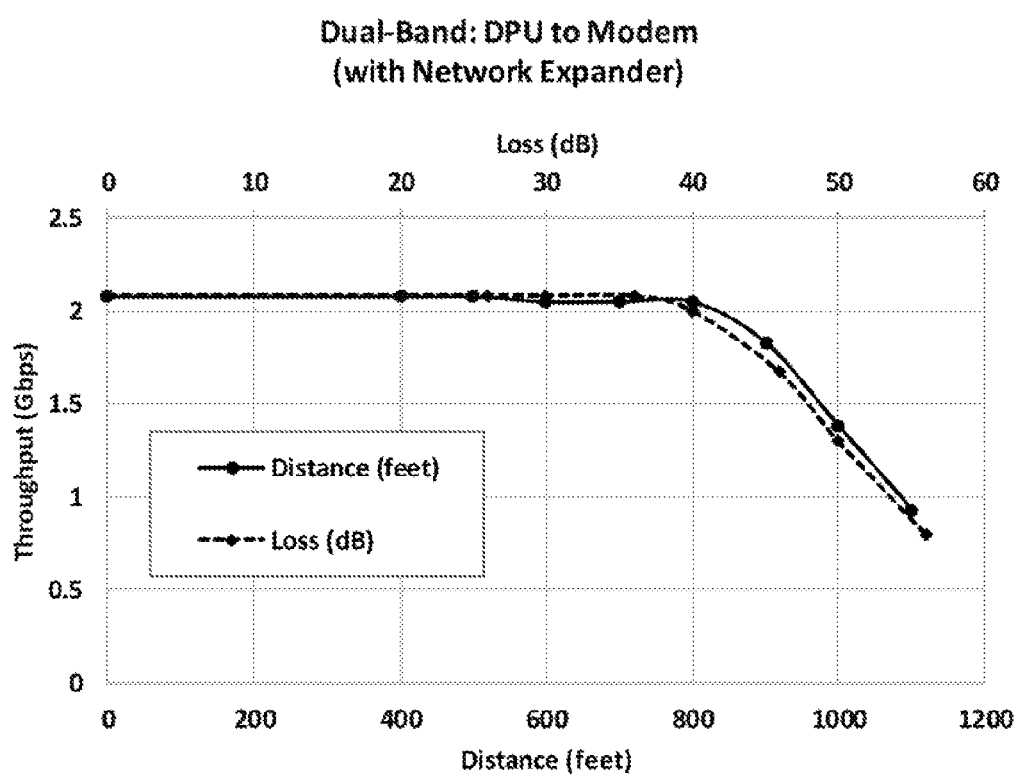
FIG. 11C depicts a graph of aggregate data rates measured during a test at different distances between a dual-band DPU and a dual-band modem when one dual-band DPU is present between them.

FIGS. 11A-11C depict graphs of aggregate data rates measured at different distances using test embodiments of a dual-band DPU 106, a dual-band modem 108, and a dual-band network expander 704.

FIG. 11A depicts a graph of aggregate data rates measured during a test at different distances between a dual-band DPU 106 and a dual-band modem 108. As shown, in some embodiments aggregate data speeds between a dual-band DPU 106 and a dual-band modem 108 can be over 2 Gbps using MoCA across a coaxial cable 104 link that is up to 400 feet long. As such, dual-band modems 108 connected to a dual-band DPU 106 with coaxial cables 104 shorter than 400 feet long can achieve peak aggregate data speeds of over 2 Gbps. Additionally, although speeds can decrease at longer distances, in some embodiments dual-band modems 108 connected at up to 650 feet can still achieve aggregate data speeds of over 1 Gbps.

FIG. 11B depicts a graph of aggregate data rates measured during a test at different distances between a dual-band network expander 704 and a dual-band modem 108. As shown, in some embodiments, a dual-band network expander 704 can provide an additional 400 feet of distance at which data can be transferred at 2 Gbps aggregate speeds.

FIG. 11C depicts a graph of aggregate data rates measured during a test at different distances between a dual-band DPU 106 and a dual-band modem 108 when one dual-band DPU 106 is present between them. As shown, aggregate data speeds can be over 2 Gbps using MoCA across a coaxial cable 104 link that is up to 800 feet long when the link is extended with a dual-band network expander 704. Additionally, aggregate data speeds can be over 1 Gbps at over 1000 feet in such an environment.

Accordingly, as shown in FIGS. 11A-11C, while a dual-band modem 108 can achieve peak 2 Gbps aggregate speeds without a network expander 704 when its link to a dual-band DPU 106 is less than 400 feet, a dual-band network expander 704 can be used to provide peak 2 Gbps aggregate speeds to dual-band modems 108 that are farther away within an MDU. Although not shown, additional network-expanders 704 could further increase the distance at which 2 Gbps aggregate speeds could be provided.

As shown in FIGS. 8 and 10, the configuration of an MDU network 100 can be customized according to the number of modems 108 to be connected to a DPU 106 and/or the distance of each modem 108 to the DPU 106. If and when additional modems 108 are to be connected, the MDU network 100 can be expanded with network expanders 704 to provide new modems 108 network access at the same high aggregate speeds as other modems 108 already present in the MDU network 100.

In comparison to other MDU networking systems such as G.fast, which provides network access over phone lines, the MDU network 100 described herein can provide higher peak aggregate data speeds to each unit. By way of a non-limiting example, while some G.fast implementations limit units to sharing a network connection with aggregate speeds of 2.5 Gbps downstream and 1.5 Gbps upstream at a peak aggregate rate per unit of only 700 Mbps, some embodiments of a single-band MDU network 100 can share a connection of the same speed at a peak aggregate rate of 1.1 Gbps per unit, while some embodiments of a dual-band MDU network 100 can share a connection of the same speed at a peak aggregate rate of 2.1 Gbps per unit.

The elements of an MDU network can also use less power than the elements of a G.fast network. By way of a non-limiting example, some G.fast implementations use network elements that use up to 4 watts per unit to provide network access to the MDU's units. However, test results show that in some embodiments a single-band DPU 106 can use just 0.4 watts per modem 108, and as such a DPU 106 supporting connections to 15 modems 108 would use 6 watts total for all of its connections instead of 4 watts per unit. Test results also show that in some embodiments a single-band modem 108 can use 8 watts, while a single-band network expander 704 can use 4 watts. Network elements in a dual-band MDU network 100 can use more power, but provide higher aggregate speeds as described above. By way of a non-limiting example, test results show a dual-band DPU 106 using 16 watts total, a dual-band modem 108 using 14 watts, and a dual-band network expander using 16 watts. Moreover, the DPU 106 and/or modems 108 in an MDU network 100 can be reverse powered using electricity passed to them over coaxial cable 104 from other locations in the MDU.

FIGS. 12A-12D depict exemplary embodiments of an MDU network that can coexist with television equipment that uses the same coaxial cables 104. Television equipment can include a television source 1200 for the MDU and a television receiver 1202 in each of the MDU's units. The television source 1200 can be one or more devices that provide television signals to the television receivers 1202, such as a switch that distributes television signals received from a satellite dish on the MDU's roof. The television receivers 1202 can be one or more devices that receive and/or play back television signals, such as televisions or set-top boxes.

Figure 12A:
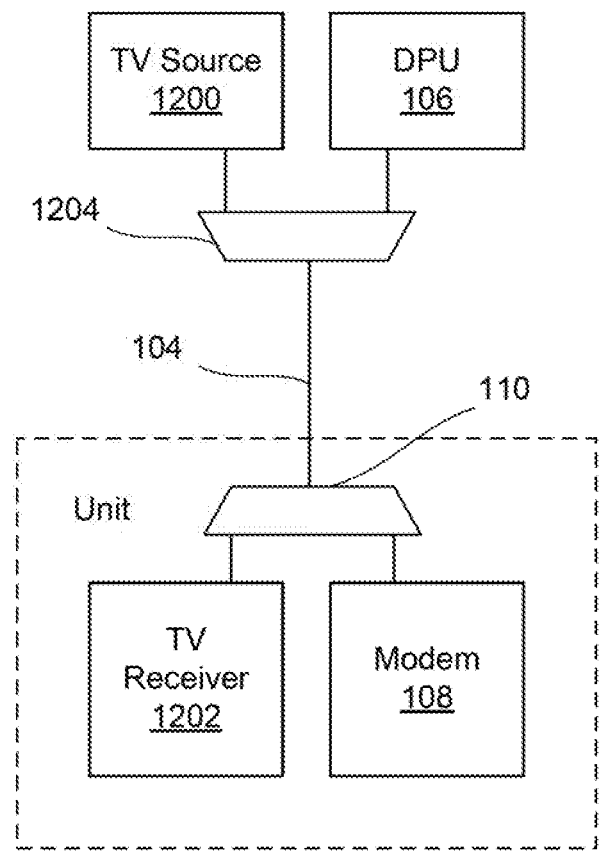
FIG. 12A depicts an embodiment in which a television source and a DPU both feed into a combiner linked to a shared coaxial cable.

FIG. 12A depicts an embodiment in which a television source 1200 and a DPU 106 both feed into a combiner 1204 linked to a shared coaxial cable 104. The coaxial cable 104 can run to a unit at the MDU, where a splitter 110 can divide the coaxial cable 104 between a modem 108 and a television receiver 1202. As such, the television source 1200 can provide television signals to the unit's television receiver 1202 using one range of RF frequencies, while the DPU 106 can simultaneously provide network access to the unit's modem 108 over the same coaxial cable 104 using single-band or dual-band ranges of RF frequencies.

Figure 12B:
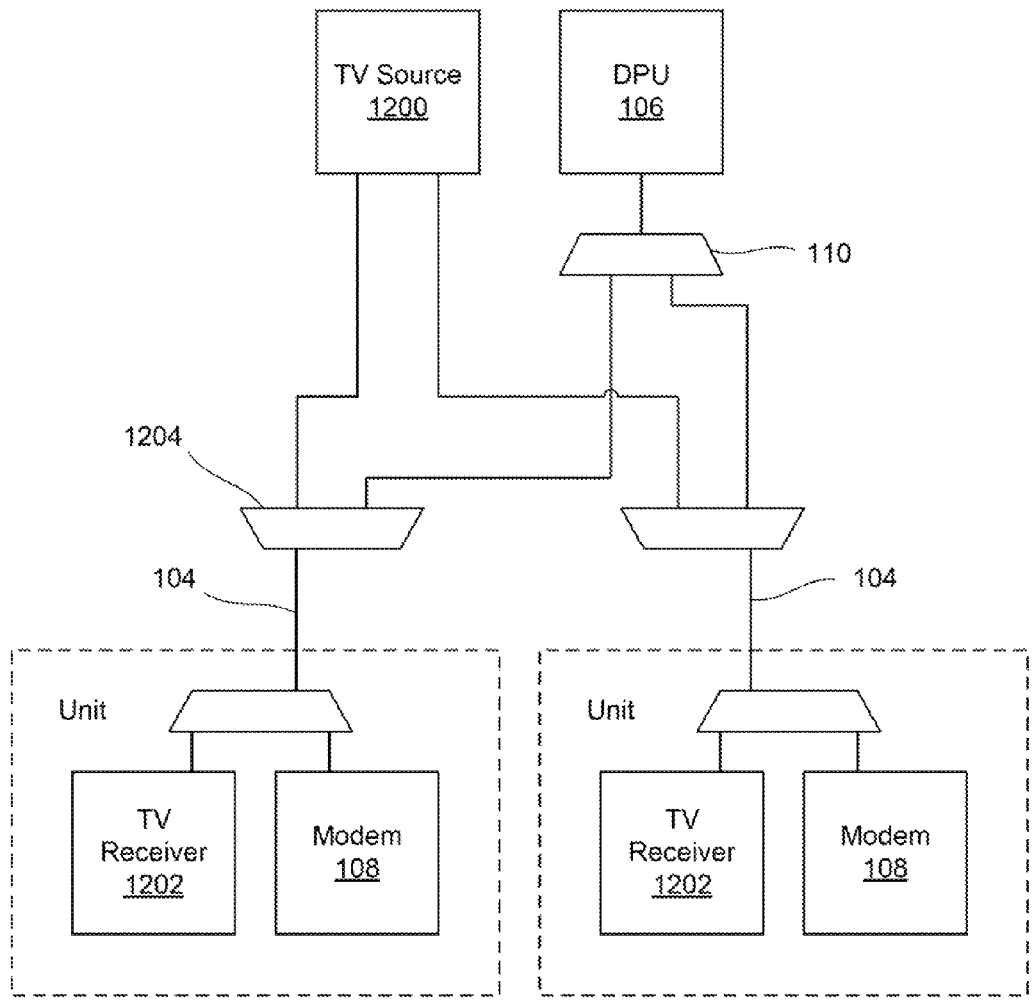
FIG. 12B depicts an embodiment in which a DPU feeds into a splitter that can lead to a plurality of different combiners linked to a television source.

FIG. 12B depicts an embodiment in which a DPU 106 feeds into a splitter 110 that can lead to a plurality of different combiners 1204. Each combiner 1204 can also receive television signals over a different link from a television source 1200, such that the combiner 1204 can pass both data and television signals over a link of coaxial cable 104 to a unit in the MDU.

Figure 12C:
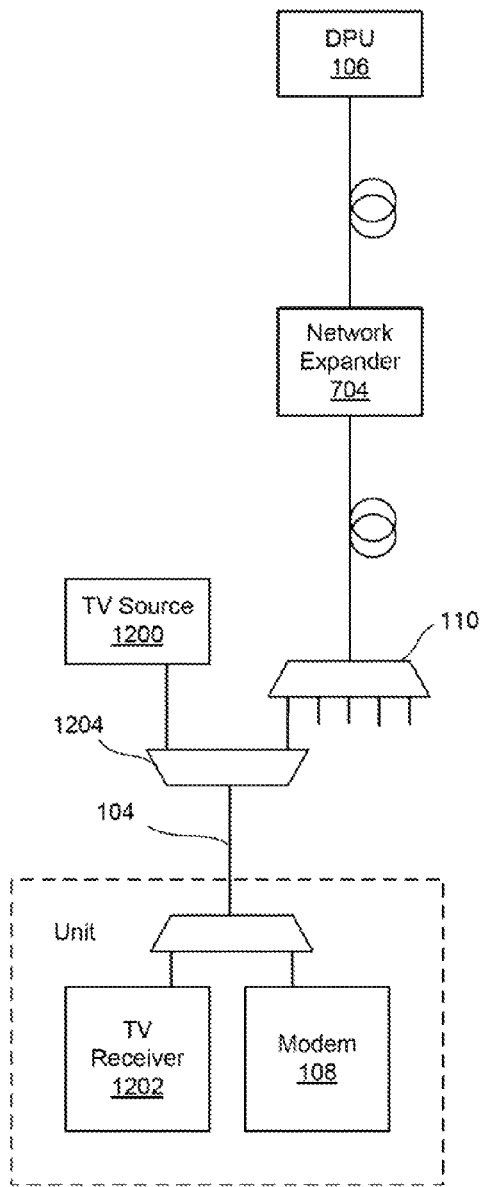
FIG. 12C depicts an embodiment in which a network expander extends the length of a link of coaxial cable between a DPU and a splitter.
Figure 12D:
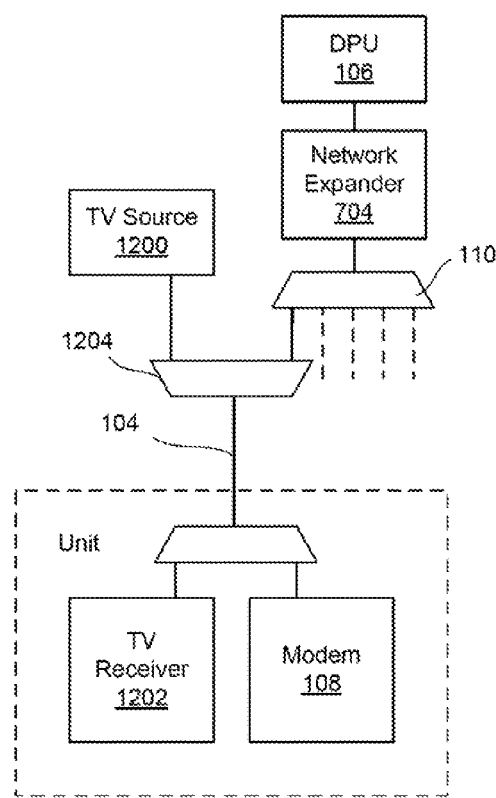
FIG. 12D depicts an embodiment in which a network expander is connected to a splitter to expand the number of modems that can be connected to a DPU.

FIGS. 12C and 12D depict embodiments in which a network expander 704 is present between a DPU 106 and a splitter 110. A coaxial cable 104 from the splitter 110 can then feed into a combiner 1204 that also receives a signal from a television source 1200. As with the embodiment of FIG. 12A, in these embodiments a coaxial cable 104 can lead from the combiner 1204 to a unit in the MDU such that a modem 108 and a television receiver 1202 in the unit can both receive signals through that coaxial cable 104.

As shown in FIG. 12C, in some embodiments the network expander 704 can be used to extend the distance between the DPU 106 and other equipment, such that data can be transmitted over longer distances via coaxial cable 104 before data speeds decrease. By way of a non-limiting example, when a television source 1200 such as a television antenna or satellite dish is located on an MDU's roof but the DPU 106 is located in the MDU's basement, a network expander 704 can be used to extend a link of coaxial cable 104 to a location in the MDU at which it can be linked to a combiner 1204 that is also linked with the television source 1200.

As shown in FIG. 12D, in some embodiments the network expander 704 can also, or alternately, be used to feed into a splitter 110 that can expand the number of modems 108 that can be connected. By way of a non-limiting example, a link from the DPU 106 can feed into a network expander 704, which can feed into a splitter 110 that splits the line of coaxial cable 104 into a plurality of different units in the MDU. As shown in FIG. 12D, each line passing into a unit can also be combined with a line from a television source 1200 such the unit can receive both data and television signals.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

The invention claimed is:

1. A Multimedia over Coax Alliance (MoCA) system, comprising:
    at least one network expander for distributing at least one signal channel;

at least one distribution point unit (DPU) distributing the at least one signal channel to and from the network expander; and one or more modems receiving the at least one signal channel, wherein the network expander is connected between the DPU and a set of the modems and retransmits received signals using MoCA protocols, and wherein an independent power inserter coupled to a power source and linked to coaxial cable passes power over the coaxial cable to a power tap at the DPU to reverse power the DPU.

2. The MoCA system of claim 1, wherein multiple DPUs are daisy chained together in the system.

3. The MoCA system of claim 1, wherein the network expanders, DPUs and modems are interconnected by at least one of coax, optical fibers, or wireless connections.

4. The MoCA system of claim 1, further comprising providing a power subsystem which is a dedicated power inserter, where power is injected by the power subsystem into any one or more of: the network expanders, the DPUs and the modems.

5. The MoCA system of claim 4, wherein at least one of the modems is a pluggable transceiver that is removably plugged into a network device and receives power via a connected coaxial cable.

6. The MoCA system of claim 4, wherein the power subsystem comprises a power tap linked to a coaxial cable port that receives electricity passed to it through a connected coaxial cable.

7. The MoCA system of claim 1, wherein at least one of the modems passes power over coaxial cable to the DPU to reverse power the DPU.

8. The MoCA system of claim 1, wherein the DPUs and modems are single-band devices that exchange data within one RF frequency range using MoCA protocols.

9. The MoCA system of claim 1, wherein the DPUs and modems are dual-band devices that exchange data within two different RF frequency ranges using MoCA protocols.

10. The MoCA system of claim 1, wherein the system links the at least one signal channel as an aggregate over multiple RF channels.

11. The MoCA system of claim 1, wherein the system links the at least one signal channel as an aggregate over at least three separate Orthogonal Frequency Division Multiplexing (OFDM) channels.

12. The MoCA system of claim 1, wherein the network expander supports enforcement of class of service and quality of service.

13. A data network for a multiple dwelling unit, comprising:

a distribution point unit (DPU) comprising one or more coaxial cable ports and a network cable interface connected to an access network;

a plurality of modems in a multiple dwelling unit (MDU);

a plurality of coaxial cables extending through the MDU from the one or more coaxial cable ports of the DPU to the plurality of modems; and at least one network expander present between the DPU and a subset of the plurality of modems, the network expander being a repeater that retransmits received signals, wherein the DPU, the plurality of modems, and the at least one network expander exchange data via the plurality of coaxial cables using MoCA (Multimedia over Coax Alliance) protocols, and wherein the network expander retransmits received data to increase a distance at which data can be exchanged between the DPU and the plurality of modems before a decrease in aggregate data speeds.

14. The data network of claim 13, wherein the DPU comprises a second network cable interface connected via a network cable to a first network cable interface of a second DPU, such that the second DPU has indirect access to the access network via the DPU.

15. The data network of claim 13, wherein the DPU, the plurality of modems, and the at least one network expander exchange data within one or more RF frequency ranges using MoCA protocols that do not conflict with RF frequency ranges used to transmit television signals over the plurality of coaxial cables from a television source to television receivers in the units of the MDU.

16. The data network of claim 13, wherein a subset of the plurality of modems are subtended to the at least one network expander, thereby increasing a number of modems that can be connected to the DPU.

* * * * *